United States Patent [19]
Mays

[11] 3,756,323
[45] Sept. 4, 1973

[54] PLUG CUTTER
[76] Inventor: Ivan K. Mays, 311 Briarwood Trl., Austin, Tex. 78746
[22] Filed: Oct. 26, 1971
[21] Appl. No.: 192,005

[52] U.S. Cl. .................................. 172/22, 294/50.5
[51] Int. Cl. ............................................. A01b 45/02
[58] Field of Search ............................... 172/21, 22; 294/50.5; 47/37; 111/4, 98

[56] References Cited
UNITED STATES PATENTS
| | | | |
|---|---|---|---|
| 1,653,994 | 12/1927 | Emmet | 172/22 UX |
| 2,612,725 | 10/1952 | Casey | 172/22 X |
| 3,163,455 | 12/1964 | Tuggle, Jr. | 294/50.5 |

FOREIGN PATENTS OR APPLICATIONS
| | | | |
|---|---|---|---|
| 27,185 | 11/1907 | Great Britain | 294/50.5 |
| 444,416 | 1/1936 | Great Britain | 172/22 |

Primary Examiner—Robert E. Pulfrey
Assistant Examiner—Stephen C. Pellegrino
Attorney—John C. Stahl

[57] ABSTRACT

A manually operated cutting device for removing cylindrical plugs of turf employing a tubular cutting member adapted for insertion into the turf, a disc movably mounted within said cutting member, means coacting with said disc to provide plugs of uniform size, and foot-operated means remotely connected to said disc to eject said plugs.

3 Claims, 4 Drawing Figures

PATENTED SEP 4 1973

3,756,323

IVAN K. MAYS
INVENTOR.

BY John C. Stahl

ATTORNEY

PLUG CUTTER

BACKGROUND OF THE INVENTION

In many instances, bare spots and diseased areas appear in established lawns which desirably are to be removed and replanted with viable turf. The plug cutter of the subject invention permits a cylindrical plug to be removed from such bare spot and a plug of viable turf of the same size to be inserted therein whereby a lawn is repaired, with a minimum of effort, and with no undesirable visual effects of such repair. Additionally, the cutting device may be used to provide a hole of predetermined depth for the planting of bulbs and other small plants.

SUMMARY OF THE INVENTION

A manually operated cutting device adapted to penetrate the sod, remove a cylindrical plug of uniform size, and foot-operated means for ejecting said plug; said cutting device is universal in its adaptability, extremely simple to operate, and requires little or no maintenance over extended periods of time.

Figure 1:
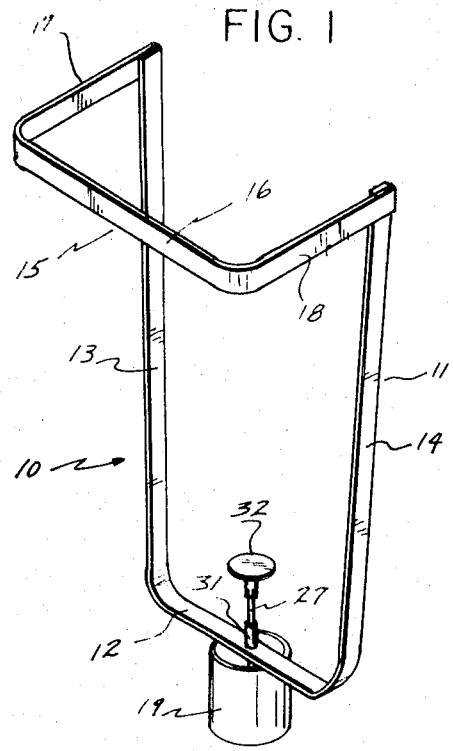
FIG. 1 is a perspective view of the plug cutter of the subject invention.

Referring now to the drawings, wherein like reference characters designate like or corresponding parts throughout the several views, there is shown in FIG. 1 the preferred embodiment of plug cutter 10 of the subject invention. A generally U-shaped frame member 11 comprises cross member 12 which terminates outwardly in spaced, upwardly extending legs 13–14; an essentially horizontally extending, U-shaped handle member 15 comprises cross member 16 and rearwardly extending arms 17–18 which are fixedly secured to the upper ends of legs 13–14, respectively, as by welding or the like. It is understood that legs 13,14 of frame member 11 may be parallel or diverge upwardly; in like manner, arms 17,18 of handle member 15 may be parallel or diverge rearwardly.

Figure 2:
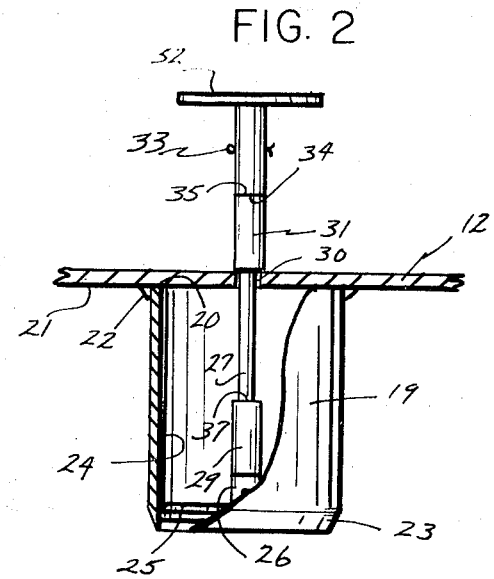
FIG. 2 is a fragmentary, enlarged, side elevational view, partly broken away and partly in section, of the lower, medial portion of the plug cutter.
Figure 3:
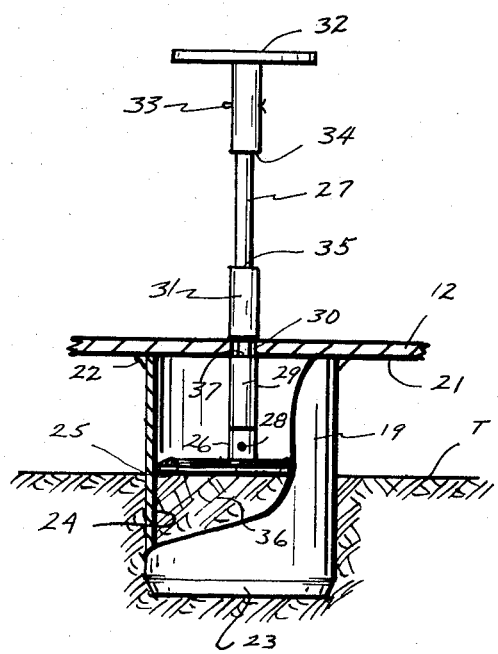
FIG. 3 is a fragmentary, enlarged, side elevational view, partly broken away and partly in section, of the lower, medial portion of the plug cutter inserted into the sod.

As best seen in FIGS. 2 and 3 of the drawings, a downwardly depending cylinder 19, ranging from approximately one to four inches in diameter, terminates upwardly in edge 20 which partially abuts and is fixedly secured to the approximate medial, lower surface 21 of cross member 12 as by weld 22; downwardly, cylinder 19 is preferably beveled, indicated by reference numeral 23. Bore 24 of cylinder 19 accommodates disc 25 which rides therein in a relatively loose fit. Flanged collar 26 is conventionally secured to the upper surface of disc 25 and accommodates the lower end of shaft 27 secured therein as by cross pin 28 or the like. Shaft 27 carries cylindrical spacer 29, passes through bore 30 in cross member 12, carries cylindrical spacer 31, and the upper end is detachably secured in flanged collar 32 as by cotter pin 33 or the like passing through aligned bores (not shown) in such parts. When the lower edge 34 of flanged collar 32 butts the upper edge 35 of cylindrical spacer 31, disc 25 remotely connected thereto is in proximity to the lower edge of cylinder 19.

In use, cylinder 19 is placed upon a selected portion of turf T and the user then places his feet upon cross member 12 laterally of flanged collar 32 and grasps arms 17,18 of handle member 15 with the hands. If required, the cutter 10 may be rocked forwardly and rearwardly, as well as laterally, until cylinder 19 penetrates the turf, as shown in FIG. 3 of the drawings. At such time, the upper surface of plug 36 formed within bore 24 bears against the lower surface of disc 25 and flanged collar 32 remotely connected thereto is forced upwardly until stopped by the upper edge 37 of spacer 29 bearing against the lower surface 21 of cross member 12. The user then removes his feet from cross member 12, exerts an upward force on handle member 15 whereby cylinder 19 is removed from the turf, after which a downward force applied to flanged collar 32 ejects plug 36 from bore 24 of said cylinder. It is understood that a turf plug of desired depth may be obtained by selecting a corresponding cylindrical spacer 29 which controls the depth of penetration of cylinder 19 into the turf.

Figure 4:
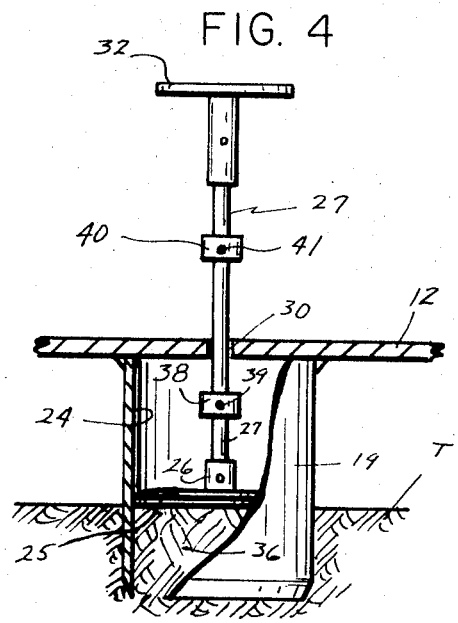
FIG. 4 is a fragmentary, enlarged, side elevational view, partly broken away and partly in section, of a modification of the invention, showing the lower, medial portion of the plug cutter at least partially inserted into the sod.

There is shown in FIG. 4 another embodiment of the invention constructed substantially in accordance with the principles heretofore described whereby collar 38 is adjustably secured on shaft 27 downwardly of cross member 12 by means of set screw 39 or the like; collar 40 is adjustably secured on said shaft upwardly of cross member 12 as by set screw 41 which is adjusted to bear against said shaft. The lower limit of travel of disc 25 in bore 24 is regulated by the placement of collar 40 and the depth of penetration of cylinder 19 into the turf T is regulated by the placement of collar 38.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A plug cutter comprising a generally U-shaped frame member consisting of a cross member and upstanding first and second elongated legs, an essentially horizontally extending handle member consisting of a cross member and first and second rearwardly extending arms secured respectively to said first and second legs of said frame member, a downwardly depending cylinder fixedly secured to the approximate medial portion of said cross member, a disc movably mounted in said cylinder, a shaft having first and second ends, said first end secured to said disc, a first cylindrical member on said shaft downwardly of said cross member, a bore in said cross member accommodating said shaft, a second cylindrical member on said shaft upwardly of said cross member, and foot-operated means secured to the second end of said shaft whereby a force applied to said cross member causes said cylinder to penetrate the turf until stopped by said first cylindrical member abutting said cross member.

2. The invention of claim 1 wherein said first cylindrical member is of a predetermined height whereby said plug is of a predetermined depth.

3. The invention of claim 1 wherein said first cylindrical member is detachably secured to a selected portion of said shaft to control the depth of penetration of said cylinder, and said second cylindrical member is detachably secured to a selected portion of said shaft to control the lower limit of travel of said disc.

* * * * *